United States Patent Office 2,904,974
Patented Sept. 22, 1959

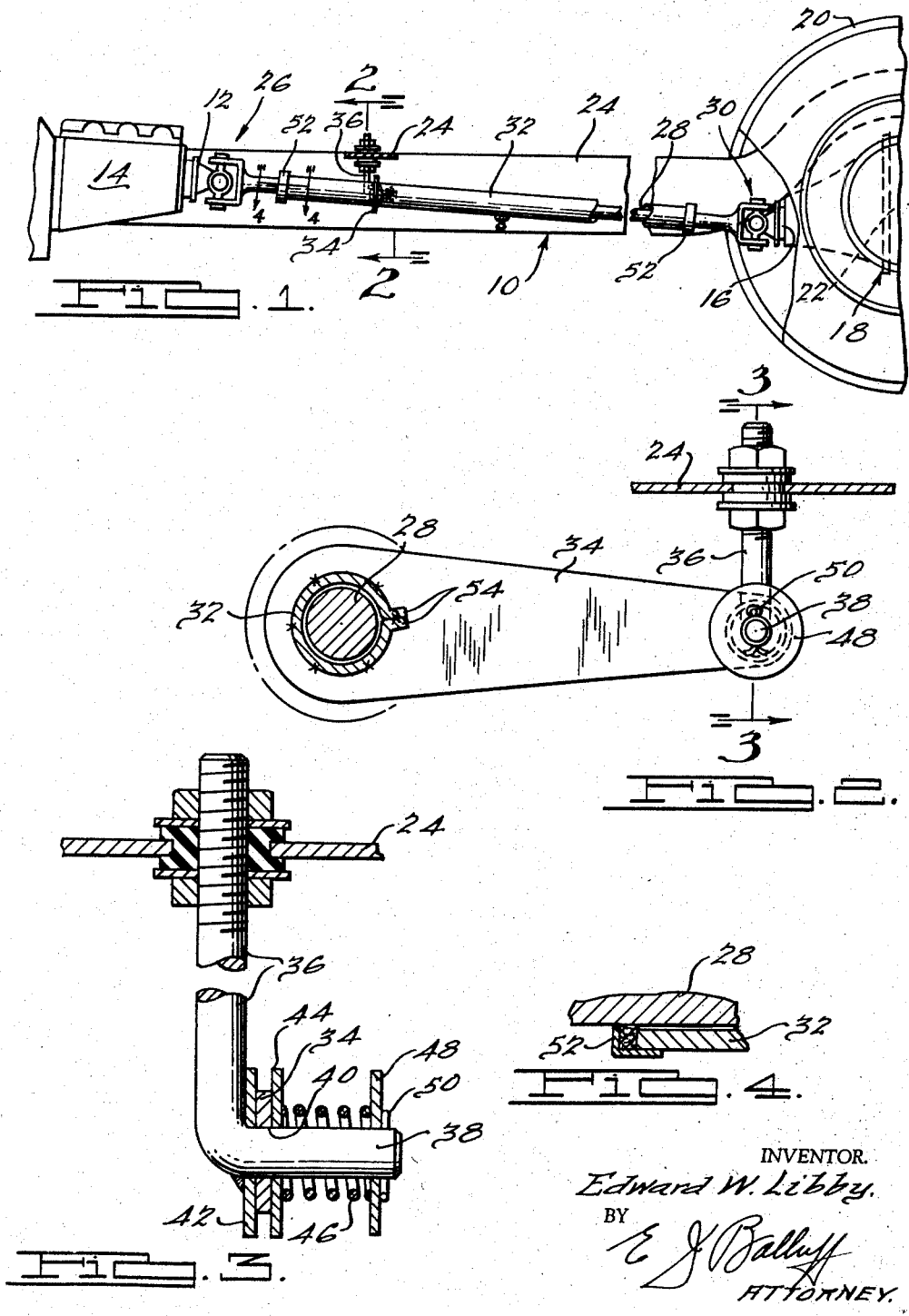

2,904,974

PROPELLER SHAFT ASSEMBLY

Edward W. Libby, Belleville, Mich.

Application September 17, 1956, Serial No. 610,083

10 Claims. (Cl. 64—1)

This invention relates to propeller shaft assemblies for the drive systems of motor vehicles and has particular reference to a propeller shaft system which minimizes and/or substantially eliminates vibration problems arising from long or extra long propeller shafts and which makes it possible to use a propeller shaft which is more flexible both in torsion and in bending than conventional shafts now used in the drive systems of motor vehicles.

A propeller shaft system embodying the invention makes possible:

The elimination of propeller shaft whipping and vibration;

The use of a propeller shaft with torsional and bending flexibility;

Improved road clearance;

A reduction in the size of the floor pan tunnel now conventionally provided;

The elimination of the hazards resulting from drive shaft breaking;

The elimination of the necessity for split propeller shafts;

The protection of the shaft against things which might throw the shaft out of balance.

According to my invention, the propeller shaft is closely embraced by a non-rotatable tubular guide member which provides a means effective along the length of the shaft to resist displacement of the axis of the shaft from a straight line during rotation of the shaft. The tubular guide member is mounted so as to permit axial displacement of it and the propeller shaft, and is constructed and arranged so as to permit relative axial movement between the propeller shaft and the tubular guide member.

A principal object of the invention therefore is to provide a new and improved propeller shaft assembly or system for the drive system of a motor vehicle.

Other and further objects of the invention will be apparent from the following description and claims and may be understood by reference to the accompanying drawing, of which there is one sheet, which by way of illustration shows a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a fragmentary side elevational view of a motor vehicle chassis having a drive system and propeller shaft system embodying the invention;

Fig. 2 is a fragmentary sectional view taken along the line 2—2 of Fig. 1;

Fig. 3 is a sectional view taken along the line 3—3 of Fig. 2; and

Fig. 4 is a sectional view taken along the line 4—4 of Fig. 1.

As shown in Fig. 1, a propeller shaft assembly indicated generally at 10 forms a part of a Hotchkiss drive type of drive system of a motor vehicle, and drivingly connects the power output shaft 12 of the vehicle motor transmission unit 14 with the input shaft 16 of a driving axle 18 on which the road driving wheels 20 of the vehicle are mounted. The transmission 14 is connected to the engine and is usually resiliently mounted on the vehicle frame 24. Driving axle 18 includes the usual differential 22 which with the remainder of the rear axle assembly is unsprung, the input shaft 16 projecting forwardly from the differential 22. The chassis frame may be supported by the usual springs.

As shown, the propeller shaft assembly comprises a first universal joint 26, a propeller shaft 28, and a second universal joint 30, the joints and shaft being connected in the order named with the joint 26 connected to the output shaft 12 of the engine and the joint 30 connected to the input shaft 16 of the differential 22.

The propeller shaft assembly further includes a tubular guide member 32 which closely embraces the propeller shaft 28 for the major portion of its length and provides a means to prevent whipping of the shaft 28 without limiting the angular displacement of the joints 26 and 30. A torque arm 34 affixed at one end to the tubular member 32 and at its other end to a flexible mounting provided on the vehicle frame prevents rotation of the tubular member 32 with the propeller shaft 28 while permitting axial displacement of the tubular member 32 and propeller shaft 28. The flexible mounting or connection for the torque arm 34 includes a threaded member 36 carried by a part of the frame 24 and having an end 38 which extends through an opening 40 in one end of the torque arm 34. The torque arm 34 is confined between a washer 42 fixed on the member 36 and a washer 44 backed up by a spring 46 which in turn is backed up by a washer 48 and a cotter pin 50 which extends through a hole in the end 38 of the member 36. The washer 44 may be of friction material and the spring 46 may be of sufficient strength so as to resist pivotal movement of the arm 34 about the end 38, thus causing the torque arm 34 to resist displacement of the tubular member 32 and shaft 28 during operation of the vehicle.

The shaft 28 preferably is statically and dynamically balanced, as is conventional, and the outer surface of it is cylindrical and smooth. The tubular member 32 has a cylindrical inner surface but it need not be finished like a bearing surface. The fit between the shaft 28 and the tube 32 may be a very loose fit. Preferably the space or clearance between the outside of the shaft 28 and the inside of the tube is filled with grease which, if the clearance is considerable, tends to center the shaft 28 within the tube 32 and to dampen vibration in the shaft 28. As the function of the tube 32 is to provide a means effective along the length of the shaft 28 to resist displacement of the axis of the shaft from a straight line during its rotation, the fit preferably should be a running fit, but I have found that a very loose fit will give very good results if the clearance between the tube 32 and the shaft 28 is filled with grease. To prevent the loss of lubricant or grease between the shaft 28 and the tube 32, the ends of the tube may be provided with dirt or grease seals, as indicated at 52. The clearance between the shaft 28 and the tube 32 has been exaggerated in the drawings.

The tubular member 32 may be provided with an integral longitudinal rib or flange 54 as shown so as to provide more stiffness in the tube laterally than vertically. The tube 32 may be internally provided with bushings or bearing surfaces at a plurality of points along its length, with the intervening spaces filled or partly filled with lubricant or grease.

The tube 32 thus functions as a damper tube tending to hold the drive shaft 28 straight or to return it to a straight condition if it has been urged out of alignment.

Since the non-rotating tube 32 closely embraces the shaft 28 along its length, it resists bending or vibration of the shaft 28 along its length. The tubular member 32 preferably is comparatively rigid against bending as compared with the propeller shaft 28, thus permitting the propeller shaft 28 to be made of such a diameter so as to have torsional and bending flexibility. With this arrangement I have found that for a given system, the drive shaft 28 may be very substantially smaller in diameter than conventional drive shafts, and that the outer diameter of the tube 32 may also be substantially less in diameter than the diameter of conventional drive shafts. This not only provides more road clearance, but also makes it possible to reduce the size of the floor pan tunnel now conventionally provided to afford clearance for the propeller shaft 28. The propeller shaft 28 is free to move axially relative to the damper tube 32, which in turn is free to move lengthwise within the limits of its flexible connection to the frame 24. The power output shaft 12 which is connected to the joint 26 includes a conventional telescoping arrangement which accommodates the horizontal displacement of the rear axle 18 usually encountered in Hotchkiss drives.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. In the drive system of a motor vehicle, a propeller shaft assembly comprising a first universal joint, a propeller shaft, and a second universal joint, said shafts and joints being connected in series in the order named in said drive system, a tubular guide member wholly disposed between said joints and closely embracing the propeller shaft for the major portion of its length and providing means to prevent whipping of said shaft without limiting the angular displacement of said joints, and means to prevent rotation of said tubular member with said propeller shaft while permitting axial displacement of said tubular member and propeller shaft, said propeller shaft having torsional and bending flexibility relative to said tubular member while said tubular member is comparatively rigid against bending as compared with said propeller shaft.

2. A structure according to claim 1 wherein said means comprises a torque arm affixed at one end to said tubular member and a flexible mounting on the vehicle to which the other end of said torque arm is connected.

3. In the drive system of a motor vehicle, a propeller shaft assembly comprising a first universal joint, a propeller shaft, and a second universal joint, said shafts and joints being connected in series in the order named in said drive system, an elongated tubular guide member closely embracing the propeller shaft for the major portion of its length and providing means effective along the length of said guide member to resist displacement of the axis of said shaft from that of said tubular guide member during rotation of said shaft, and damper means to prevent rotation of said tubular guide member with said propeller shaft while permitting axial displacement of said tubular guide member and propeller shaft, said propeller shaft having torsional and bending flexibility relative to said tubular member while said tubular member is comparatively rigid against bending as compared with said propeller shaft.

4. A structure according to claim 3 wherein said tubular member and shaft are axially shiftable relative to each other.

5. In the drive system of a motor vehicle, a propeller shaft, a tubular guide member shorter in length than said shaft and closely embracing the propeller shaft for the major portion of its length and providing means effective along the length of said shaft to resist displacement of the axis of said shaft relative to the axis of said guide member during rotation of said shaft, and means to prevent rotation of said tubular member with said propeller shaft without substantially resisting displacement of said propeller shaft with said tubular member, said propeller shaft having torsional and bending flexibility relative to said tubular guide member while said tubular guide member is comparatively rigid against bending as compared with said propeller shaft.

6. A structure according to claim 5 wherein the clearance between said tubular member and shaft is filled with lubricant.

7. In the drive system of a motor vehicle, a propeller shaft, a tubular member surrounding and closely embracing the propeller shaft for the major portion of its length and providing means effective along the length of said shaft to resist displacement of the axis of said shaft from a straight line during rotation of said shaft and means to prevent rotation of said tubular member with said propeller shaft while permitting axial displacement of said tubular member and propeller shaft.

8. A structure according to claim 7 wherein the clearance between said tubular member and said shaft is filled with fluid which cooperates with said tubular member to dampen vibrations in said shaft.

9. In the drive system of a motor vehicle, a propeller shaft and means supported on and effective along the length of said shaft and non-rotatable relative thereto to resist displacement of the axis of said shaft from a straight line during rotation of said shaft, while permitting axial displacement of said propeller shaft.

10. A structure according to claim 9 wherein said propeller shaft has torsional and bending flexibility relative to said means while said means is comparatively rigid against bending as compared with said propeller shaft.

References Cited in the file of this patent

UNITED STATES PATENTS

| | | |
|---|---|---|
| 1,397,304 | White | Nov. 15, 1921 |
| 1,435,355 | Weaver | Nov. 14, 1922 |
| 1,627,936 | Swenson | May 10, 1927 |
| 1,664,713 | Strickland | Apr. 13, 1928 |
| 1,784,436 | Hadley | Dec. 9, 1930 |
| 2,027,329 | Van Ranst | Jan. 7, 1936 |
| 2,067,287 | Pearce | Jan. 12, 1937 |
| 2,092,291 | Olsen | Sept. 7, 1937 |
| 2,162,159 | Cole | June 13, 1939 |
| 2,389,562 | Storch | Nov. 20, 1945 |
| 2,652,700 | Seibel | Sept. 22, 1953 |